United States Patent Office 2,910,452
Patented Oct. 27, 1959

2,910,452

POLYVINYL CHLORIDE AND POLY ALKYL TIN MERCAPTOSUCCINATES

Marc Jean Lazare Crauland, Paris, France, assignor to The Societe Anonyme des Manufactures des Glaces et Produits Chimiques de Saint-Gobain, Chauny & Cirez, Paris, France No Drawing. Application June 23, 1955
Serial No. 517,651

Claims priority, application France June 26, 1954

10 Claims. (Cl. 260—45.75)

This invention relates to a new class of organic tin compounds, to new methods of making them and to novel uses for them, particularly the stabilization of vinyl chloride and other halogenated vinyl resins.

The new compounds are thiomalates of dialkyl and trialkyltin which are substituted on sulphur by an acidyl radical

$R_1$ may be any hydrocarbon radical aliphatic or aromatic such as for example methyl, ethyl, propyl, phenyl, tolyl, benzyl, etc.

These compounds are characterized by the presence in their molecule of one or more atoms of tetravalent tin connected to two or three alkyl radicals, the remaining valences of the tin being each connected to oxygen of a carboxyl radical of thiomalic acid which bears the foregoing acidyl radical on sulphur. These compounds fall into three structure groups which are represented by the following formulas:

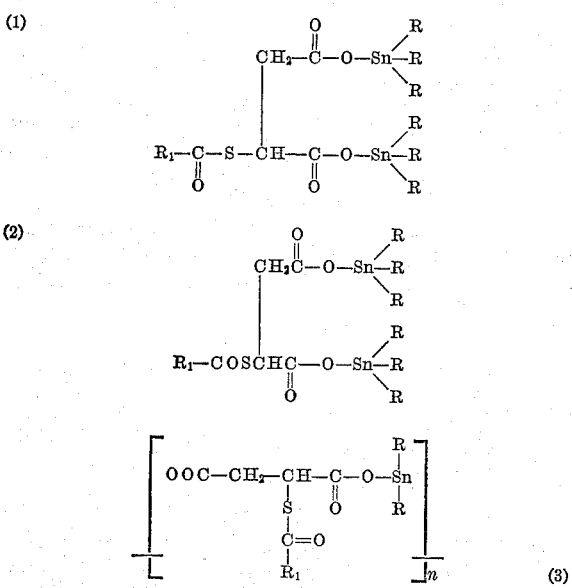

In these formulas R means alkyl but is preferably alkyl from 4 to 10 carbon atoms. The compounds in which R is butyl are particularly interesting and efficient as stabilizers for halogenated vinyl resins. The description of such compounds in French Patent No. 1,105,652 is also applicable in this case.

The invention includes a process for obtaining these new products by different methods. In the first of these, alkyl tin halides are reacted with neutral alkali metal salts of S substituted thiomalic acid, the substituent on S being as above and hereinafter described. The second involves the reaction of alkyl tin hydroxides with S substituted thiomalic acid, the S substituent being as above and hereafter defined.

The compounds corresponding to the Formula 1 are obtained when trialkyltin halides or hydroxides are reacted in the above mentioned process. The compounds corresponding to the Formulas 2 and 3 are obtained when dialkyltin halides or hydroxides are employed in the process. In this latter case the compounds are generally resinous and their structure is polymeric (Formula 3). However, in some cases the compound may be at least partially monomeric (Formula 2).

For the purpose of stabilizing such resins the S-benzoyl thiomalate of tributyltin constitutes an outstanding example of this class of compounds. It may be prepared by reacting one mole of an alkali metal S-benzoyl thiomalate, the alkali metal being preferably potassium or sodium, with two moles of monochlorotributyltin. The reaction proceeds as follows:

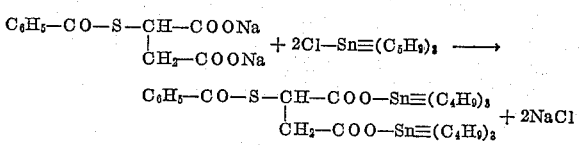

The alkali metal salt of S-benzoyl thiomalic acid may easily be prepared by reacting benzoyl chloride with sodium thiomalate in the presence of enough caustic soda to react with the HCl liberated during the reaction. S-benzoyl thiomalic acid may be freed from its alkyl salt by hydrochloric acid. It is also possible to prepare the benzoyl thiomalates of alkyl tin by the direct action of alkyl tin hydroxides on thiomalic acid substituted as aforesaid on S.

The following example illustrates the best of the products and is illustrative of the production of all the derivatives of this class.

*Example 1*

25.4 grs. of S-benzoyl thiomalic acid are exactly neutralized by 8 grs. of caustic soda dissolved in 160 cc. of water, and 65 grs. of monochlorotributyltin, a quantity slightly less than the amount theoretically necessary, is added. The deletion prevents the arrival in the final product of unreacted monochlorotributyltin. The mixture is agitated for about one hour at room temperature and produces a pasty product which is recovered in 200 cc. of benzene and washed with about 500 cc. of tepid water. The benzene is driven off and the product is dried under vacuum on the water bath, leaving 76 grs. of S-benzoyl thiomalate of tributyltin, a 71% yield. The product is a colorless liquid which crystallizes slowly, and solidifies below 20° C.

I have shown, and this constitutes another part of the invention, that the S substituted alkyl tin thiomalates, particularly those substituted by benzoyl are excellent stabilizers for resins containing halogenated vinyl resins. They are particularly good stabilizers against heat.

The stabilizers of this invention are notably effective in such resins when added to the ungelled resin in a proportion of 1–5% of the weight of the resin.

According to a modification, it is equally possible to form the stabilizer in situ during the gelling of the resin by incorporating in the ungelled resin the necessary proportions of alkyl tin hydroxide and of S substituted thiomalic acid. The proportions used are generally equimolecular.

In order to determine the value of any stabilizer one determines first the heat stability, which is the time necessary for a test sample of the resin to show the beginning of decomposition when subjected to heating under standard load at 200° C. One determines the color stability by a standard method which involves the subjection of a standard plate 3 mm. thick to 170° for 10 min. These tests are standard and are well known and enable one to assess the value of different stabilizers.

The tests have shown that the S substituted thiomalates of alkyl tin herein described, particularly tributyltin S-benzoyl thiomalate, make possible the working of polyvinyl chloride in machines for extrusion, molding, injection and the like at temperatures substantially above 200° C. and which are consequently in a state of fluidity which was not previously obtainable with these resins. This represents a considerable advantage in the working of halogenated vinyl resins, particularly polyvinyl chloride, as it permits these resins to be used by techniques of molding and extrusion in machines that were heretofore reserved for more fusible resins such as polystyrene and polyamides.

It is particularly to be noted that the new stabilizers also stabilize the color and that resins which have been treated at these high temperatures are colored so slightly as to be hardly perceptible.

The following examples illustrate the invention by means of polyvinyl chloride, which is possibly the most difficult of resins to work with and the one which is potentially the most valuable, and S-benzoyl tributyltin thiomalate, which is a preferred member of the stabilizer group.

Example 2

A mixture of 100 grs. of powdered polyvinylchloride and 3 grs. of S-benzoyl tributyltin thiomalate are worked on the roll mill at 165° C. for 10 min. and a sheet ½ mm. thick is removed, cut in small squares and subjected to heat tests as described. Under standard pressure at 200° they showed a stability, prior to the on-set of signs of deterioration, of 40 min. By superimposing seven of the squares and subjecting them for 10 min. at 170° to standard pressure between polished plates there was obtained a sheet 3 mm. thick, perfectly transparent and practically colorless.

Example 3

By the technique of Example 2 about 100 grs. of polyvinylchloride, 3 grs. of the same stabilizer and .5 gr. of sodium stearate (lubricant) were worked on the roll mill and tested. The stability was for 50 min. at 200° C. The original sheet was made into a plate 2–3 mm. thick and sent to a pelleting machine. The pellets were introduced into an extrusion press of which the body was heated to the following temperatures: 165° upon admission of the pellet, 175° in the meantime, and 195° at the end. The heat of the extrusion orifice was maintained at 215°. There was thus obtained a rigid transparent tube 14 mm. in interior diameter and 16 mm. outside diameter, transparent, colorless and without traces of decomposition.

Example 4

5 kilos of molding powder containing 90 parts by weight of polyvinyl chloride, 10 parts of octyl phthalate, 3 parts of S-benzoyl tributyltin thiomalate and .5 part of octadecenamide (lubricant) were worked on a roll mill and thereafter in a pelleting machine. The powder made by the pelleting machine was introduced into an injection press developing 970 kilos per sq. cm., of which the injection cylinder was maintained at a temperature such that the resin was ejected at a temperature of 195–200° after spending 16–17 min. in the cylinder. The resin was injected into a mold for making saucers, which was kept at 75–80° C. Molding was carried out at 42 grs. per min. The saucers were extracted from the mold and were cooled, being rigid, transparent and colorless. The press was worked for 45 min. under these conditions without any decomposition of the resin.

Example 5

26.8 grs. of

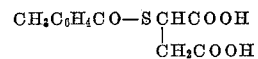

are neutralized by 8 grs. of caustic soda dissolved in 160 cc. water and 65 grs. of monochlorotributyltin is added and the preparation is followed as in Example 1.

The product is a slightly coloured liquid which crystallizes slowly below 20°. The yield is 80%. A mixture of 3 grs. of this product and 100 grs. of powdered polyvinyl chloride is tested as in Example 2 and the heat stability is found to be 30 minutes to 200° C.

Example 6

The process of the Example 5 is carried out, starting with 26.8 grs. of the compound

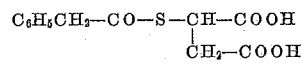

8 grs. NaOH, 160 cc. water and 65 grs. monochlorotributyltin. The heat stability is found to be 35 minutes to 200°.

Example 7

The same procedure as in Example 5 is followed starting with 20.6 grs. of S-propionyl thiomalic acid, 8 grs. NaOH, 160 grs. water and 65 grs. monochlorotributyltin. The heat stability is found to be 40 minutes to 200°.

Example 8

25.4 grs. of S-benzoyl thiomalic acid and 26.7 grs. of $(C_4H_9)_2Sn(OH)_2$ are only mixed strongly in a mixer. 3 grs. of the product which is a powder are added to 100 grs. of powdered polyvinylchloride. Then the resin is worked on a roll mill at 165° C. for 10 minutes and a sheet ½ mm. thick is obtained. In this case the stabilizer is formed in situ in the resin, during the working on the roll mill. By this procedure the stabilizer is readily and uniformly dispersed throughout the resin.

The stabilized resin is tested as indicated in the preceding examples and the heat stability is found to be of the order of 35 to 45 minutes at 200° C. The colour stability is also tested according to the method indicated in the first example: a sheet 3 mm. thick is perfectly transparent and colourless.

Example 9

The process of Example 8 is carried out, starting with 25.4 grs. of S-benzoyl thiomalic acid and 23.4 grs. of $(C_3H_7)_2Sn(OH)_2$ and the head stability tests give equivalent results.

Example 10

The process of Example 1 is carried out starting with 25.4 grs. of S-benzoyl thiomalic acid, 8 grs. NaOH dissolved in 160 cc. of water and 56.6 grs. of monochlorotripropyltin. The heat stability obtained with this stabilizer is found to be 35 minutes to 200° C.

Example 11

The process of Example 10 is carried out starting with 81.8 grs. of monochlorotrihexyltin in lieu of the 56.6 grs. of monochlorotripropyltin. The heat stability is equivalent to that found in the Example 10.

As many apparently widely different embodiments of the present invention may be made without departing from the spirit and scope thereof, it is to be understood that the invention is not limited to the specific embodiments.

What is claimed is:

1. A resinous polymer of vinyl chloride containing from 1 to 5% of an organo tin compound consisting of a polyalkyl tin mercaptosuccinate which is substituted on the sulphur atom by an acyl group $COR_1$ in which $R_1$ is one of the group consisting of alkyl and phenyl.

2. A composition according to claim 1, wherein the resinous polymer of vinyl chloride is a homopolymer.

3. A composition according to claim 2, wherein the organo tin compound is S-benzoyl di-(tributyl tin)-mercaptosuccinate.

4. A composition according to claim 2, wherein the organo tin compound is S-benzoyl dibutyl tin mercaptosuccinate.

5. A composition according to claim 1, wherein the organo tin compound is one of the group consisting of S-benzoyl di-(tributyl tin)mercaptosuccinate and S-benzoyl dibutyl tin mercaptosuccinate.

6. A composition according to claim 5, wherein the resinous polymer of vinyl chloride is a homopolymer.

7. A composition according to claim 5, wherein the alkyl group of the alkyl tin contains between 4 and 10 carbon atoms, and the alkyl group in the acyl radical $COR_1$ contains between 4 and 10 carbon atoms.

8. A composition according to claim 1, wherein the alkyl group of the alkyl tin contains between 4 and 10 carbon atoms.

9. A composition according to claim 1, wherein the alkyl group in the acyl radical $COR_1$ contains between 4 and 10 carbon atoms.

10. A composition according to claim 9, wherein the alkyl group of the alkyl tin contains between 4 and 10 carbon atoms.

References Cited in the file of this patent

UNITED STATES PATENTS

| | | |
|---|---|---|
| 2,449,418 | Sharkey | Sept. 14, 1948 |
| 2,560,034 | Eberly | July 10, 1951 |
| 2,561,673 | Proell et al. | July 24, 1951 |
| 2,604,483 | Mack et al. | July 22, 1952 |
| 2,641,588 | Leistner et al. | June 9, 1953 |
| 2,657,231 | Klarer et al. | Oct. 27, 1953 |
| 2,680,107 | Leistner et al. | June 1, 1954 |